United States Patent [19]

Omura

[11] Patent Number: 5,105,240
[45] Date of Patent: Apr. 14, 1992

[54] LIGHT-CONTROLLED SEMICONDUCTOR LIGHT COUPLER AND MODULATOR

[75] Inventor: Etsuji Omura, Itami, Japan

[73] Assignee: Mitsubishi Denki Kabushiki Kaisha, Japan

[21] Appl. No.: 648,512

[22] Filed: Jan. 30, 1991

[30] Foreign Application Priority Data

Feb. 1, 1990 [JP] Japan .................. 2-23895

[51] Int. Cl.$^5$ .......................... H01L 31/12
[52] U.S. Cl. ............................ 357/19; 357/17; 357/30; 357/16; 357/4; 372/50; 372/43; 385/2; 385/3; 385/8
[58] Field of Search .............. 357/19, 17, 30 E, 16, 357/4; 350/96.13, 96.14; 372/43, 50; 385/2, 3, 8

[56] References Cited

U.S. PATENT DOCUMENTS

| 4,716,449 | 12/1987 | Miller | 357/4 X |
| 4,800,262 | 1/1989 | Lentine | 357/4 X |
| 5,016,990 | 5/1991 | Dobson | 357/4 X |

FOREIGN PATENT DOCUMENTS 63-13016  1/1988  Japan .
63-147139 6/1988  Japan .

OTHER PUBLICATIONS

Carenco et al., "GaAs Homojunction . . . Coupler Switch", Journal of Applied Physics, vol. 51, No. 3, Mar. 1980, pp. 1325-1327.

Primary Examiner—William Mintel
Attorney, Agent, or Firm—Leydig, Voit & Mayer

[57] ABSTRACT

A light-controlled semiconductor light coupler for altering the position of and modulating a signal light in response to the intensity of a control light includes a multiple quantum well structure having an index of refraction that varies in response to the intensity of an incident, essentially monochromatic control light, first and second semiconductor light guide layers contacting and sandwiching the multiple quantum well structure for transmitting a signal light beam variably coupled between the first and second light guide layers in response to the intensity of the control light, and first and second semiconductor cladding layers contacting and sandwiching the first and second light guide layers, respectively.

24 Claims, 12 Drawing Sheets

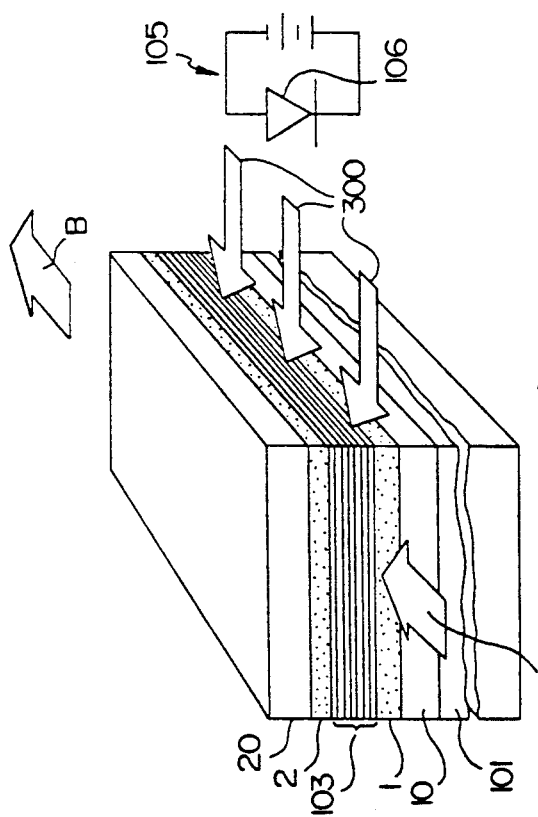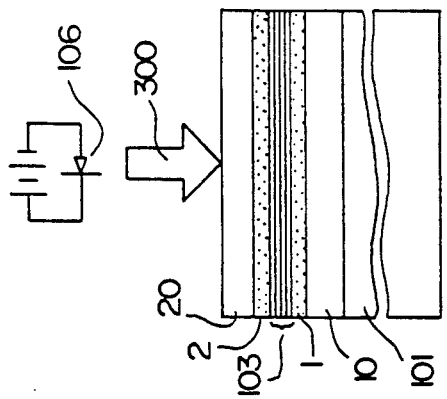
FIG. 1(a)
FIG. 1(b)

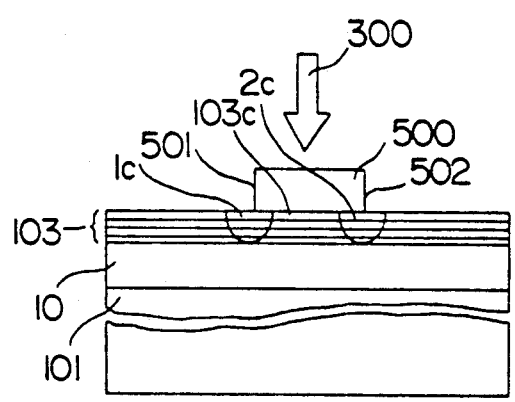
F I G. 4(a)

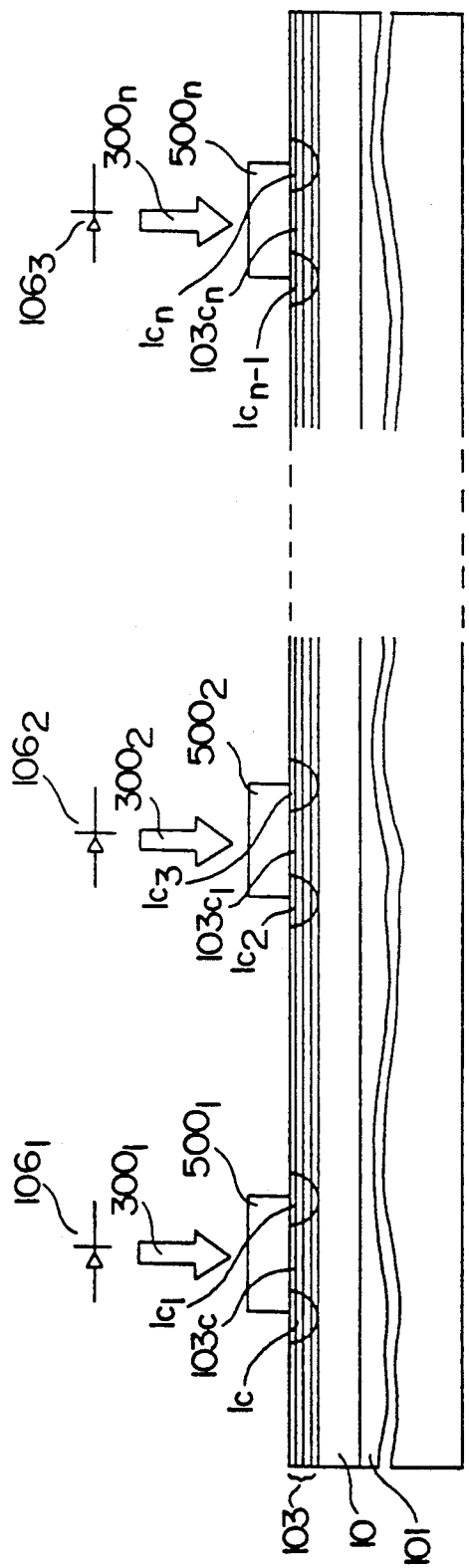

LIGHT-CONTROLLED SEMICONDUCTOR LIGHT COUPLER AND MODULATOR

FIELD OF THE INVENTION

The present invention relates to a semiconductor device for modulating and changing the position of a signal light beam in response to the intensity of a control light incident on the semiconductor device transverse to the direction of propagation of the signal light beam.

BACKGROUND OF THE INVENTION

A prior art semiconductor device that changes the position of and modulates a signal light in response to an electrical signal is shown in a perspective, schematic view in FIG. 5. The device of FIG. 5 includes two opposed, generally planar, spaced apart light guide layers 1 and 2. The light guide layers are gallium arsenide (GaAs) or aluminum gallium arsenide ($Al_xGa_{1-x}As$) where x is about 0.1. The guide layers 1 and 2 sandwich and contact a spacer layer 3 of p-type $Al_xGa_{1-x}As$. The three layer structure is, in turn, laminated between first and second n-type $Al_xGa_{1-x}As$ cladding layers 10 and 20 where x is about 0.3. The five laminated layers are disposed on a gallium arsenide substrate 101. Voltage sources 11 and 21 are provided to apply variable reverse bias voltages across spacer layer 3 and second cladding layer 20 and across spacer layer 3 and first cladding layer 10, respectively. The refractive indices of the light guide layers 1 and 2 are higher than the refractive index of the spacer layer 3 and of the first and second cladding layers 10 and 20 to confine light to the light guide layers 1 and 2. Usually, the device is compositionally symmetrical, i.e., the compositions of the light guide layers 1 and 2 are the same and the compositions of the cladding layers 10 and 20 are the same.

The device of FIG. 5 is prepared by conventional techniques. The n-type $Al_xGa_{1-x}As$ first cladding layer 10 is grown to a thickness of about 2 microns on the GaAs substrate 101 by a conventional technique, such as liquid phase epitaxy (LPE), metal organic chemical vapor deposition (MOVCD), or molecular beam epitaxy (MBE). The other layers are grown by similar techniques. The GaAs or $Al_xGa_{1-x}As$ first light guide layer 1 is grown to a thickness of about 0.2 micron, the p-type $Al_xGa_{1-x}As$ spacer layer is grown to a thickness of about 0.2 to 1.0 micron, and the guide layer 2 and second cladding layer 20 are grown to be symmetrical in thickness and composition to the first guide layer 1 and the first cladding layer 10, respectively.

After the layers are grown, electrical contacts are made to the substrate 101, the second cladding layer 20, and the spacer layer 3 to apply bias voltages from the voltage sources 11 and 21. Electrodes can be applied to the substrate and the second cladding layer using conventional techniques. However, in order to make an electrical contact to the spacer layer, an opening must be etched through second cladding layer 20 and guide layer 2 to expose the spacer layer 3. Controlling the depth of etching to ensure exposure of the spacer layer 3 having a thickness of only 0.2 to 1.0 micron without penetrating entirely through that layer presents difficult processing problems. Additional problems occur in metallizing only the spacer layer 3 as part of the forming a contact while avoiding short-circuiting of the spacer layer 3 to the light guide layer 2.

In operation, the device of FIG. 5 selectively switches a signal light beam from guide layer 1 to guide layer 2, or vice versa, in response to the strength of the electrical bias signals provided by voltage sources 11 and 21. An input signal light beam incident on the light guide layer 1 is indicated by arrow A in FIG. 5. The output signal light beam from the opposite end of the device is indicated by arrow B in FIG. 5. As schematically illustrated in that figure, the output signal light beam B can emerge from guide layer 2. It is known in the art that light guide layers 1 and 2 are optically coupled by the electromagnetic field associated with the signal light beam. The amount of the optical coupling between guide layers 1 and 2 depends upon a number of variables including the wavelength of the signal light beam, the material in which the signal light beam is propagating, and the length of the path along which the signal light beam travels. When that path is a predetermined length, called the critical length, the signal light beam entering guide layer 1 is totally transferred to guide layer 2. If the length of the device is chosen to be coincident with the critical length, then a signal light beam input into guide layer 1 will emerge from guide layer 2 at the opposite end of the device. A typical device of the type shown in FIG. 5 has a length between the light incident and output surfaces of 0.5 to 1.0 millimeter, the width of the light incident face is typically 2 microns, and the height of the device is typically 5 microns.

When reverse bias voltages are applied across the light guide layers 1 and 2 with respect to spacer layer 3, the refractive indices of the spacer layer 3 and of the light guide layers 1 and 2 are changed. The reverse bias voltages alter the width of the depletion regions created by the pn junctions and produce electro-optic effects, such as the Franz-Keldish effect, that change the refractive indices, thereby altering the critical length of the structure. Thus, by switching the reverse bias voltage applied to the device, the presence or absence of a signal light beam output from light guide layer 2 and derived from a signal light beam applied to light guide layer 1 can be controlled. By appropriately modulating the bias voltages, the signal light beam output emerging from light guide layer 1 or light guide layer 2 derived from a signal light beam applied to light guide layer 1 can be modulated.

In addition to the difficulties of fabricating the device of FIG. 5, that device is incompatible with other semiconductor devices that are controlled by light. Since the device of FIG. 5 requires the application of a reverse bias voltage to function, electrical leads and connections that are not otherwise necessary, for example, in a light-controlled computer, are required to operate the device of FIG. 5. Voltages as high as about 10 volts are required for reverse biasing the device, a voltage level that is undesirably high in many applications, particularly in a light-driven computer.

SUMMARY OF THE INVENTION

It is an object of the present invention to provide a semiconductor light-controlled light coupler and modulator that is readily compatible with other light-controlled semiconductor devices.

It is another object of the present invention to provide a semiconductor light coupler and modulator that does not require an electrical signal for operation.

It is yet another object of the present invention to provide a semiconductor light coupler and modulator that is simply fabricated, that is effective is switching the position of and modulating a signal light, and that includes a relatively wide light guide layer for transmitting light.

A light-controlled semiconductor light coupler for altering the position of and modulating a signal light beam in response to the intensity of a control light according to the invention includes a multiple quantum well structure including alternating semiconductor quantum well and quantum barrier layers, each layer having a thickness and a thickness direction parallel to the thickness, the multiple quantum well structure having an index of refraction that varies in response to the intensity of an incident, essentially monochromatic control light, first and second semiconductor light guide layers contacting and sandwiching the multiple quantum well structure for transmitting a signal light beam variably coupled between the first and second light guide layers in response to the intensity of the control light incident on the multiple quantum well structure, wherein the light guide layers have a higher index of refraction than the multiple quantum well structure, and first and second semiconductor cladding layers contacting and sandwiching the first and second light guide layers, respectively, forming a structure having the first cladding layer, the first light guide layer, the multiple quantum well structure, the second light guide layer, and the second cladding layer serially disposed, the first and second cladding layers confining the signal light beam propagating transverse to the control light in the first and second light guide layers.

Another light-controlled semiconductor light coupler for altering the position of and modulating a signal light in response to the intensity of a control light according to the invention includes a multiple quantum well structure including alternating semiconductor quantum well and quantum barrier layers, each layer having a thickness and a thickness direction parallel to the thickness, the multiple quantum well structure having an index of refraction that varies in response to the intensity of an incident, essentially monochromatic control light, first and second semiconductor light guide layers contacting and sandwiching the multiple quantum well structure for transmitting a signal light beam variably coupled between the first and second light guide layers in response to the intensity of the control light incident on the multiple quantum well structure, wherein the light guide layers have a higher index of refraction than the multiple quantum well structure, first and second semiconductor cladding layers contacting and sandwiching the first and second light guide layers and the multiple quantum well structure, the first and second cladding layers confining the signal light beam propagating transverse to the control light in the first and second light guide layers, and a source of essentially monochromatic control light for illuminating the multiple quantum well structure with the control light transverse to the direction of propagation of the signal light in the first and second light guide layers and substantially parallel to the thickness direction of the multiple quantum well structure layers.

Yet another light-controlled semiconductor light coupler according to the invention includes a multiple quantum well structure including alternating semiconductor quantum well and quantum barrier layers, each layer having a thickness and a thickness direction parallel to the thickness, the multiple quantum well structure having an index of refraction that varies in response to the intensity of an incident, essentially monochromatic control light, and first and second semiconductor cladding layers contacting and sandwiching the multiple quantum well structure wherein the second cladding layer includes first and second spaced apart ridges extending generally parallel to the thickness direction of the multiple quantum well structure layers, respectively producing first and second light guide regions in the multiple quantum well structure opposite the first and second ridges, respectively, for transmitting a signal light beam variably coupled between the first and second light guide regions in response to the intensity of the control light incident on the multiple quantum well structure between the first and second ridges and transverse to the direction of propagation of the signal light beam through the first and second light guide regions, the first and second cladding layers confining the signal light beam.

A light-controlled semiconductor light coupler according to the invention includes a multiple quantum well structure including alternating semiconductor quantum well and quantum barrier layers, each layer having a thickness and a thickness direction parallel to the thickness, the multiple quantum well structure having an index of refraction that varies in response to the intensity of an incident, essentially monochromatic control light, a semiconductor cladding layer contacting the multiple quantum well structure and confining a signal light beam to the multiple quantum well structure, and a stripe of a second material having a different composition from the multiple quantum well structure semiconductor layers and generally opposed first and second sides generally aligned with the thickness direction of the multiple quantum well structure layers, disposed on the multiple quantum well structure opposite the first cladding layer, producing first and second light guide regions in the multiple quantum well structure respectively opposite the first and second sides through stress applied by the stripe to the multiple quantum well structure, the first and second light guide regions for transmitting a signal light beam variably coupled between the first and second guide layers in response to the intensity of the control light incident on the multiple quantum well structure between the first and second light guide regions and transverse to the direction of propagation of a signal light beam through the first and second light guide regions, the first cladding layer confining the signal light beam.

BRIEF DESCRIPTION OF THE DRAWINGS

FIG. 1(a) is a perspective, schematic view of a coupler and modulator with a control light incident parallel to the layers of a multiple quantum well structure according to an embodiment of the invention.

FIG. 1(b) is a cross-sectional view of the device shown in FIG. 1(a) with a control light incident perpendicular to the layers of a multiple quantum well structure according to an embodiment of the invention.

FIG. 4(a) is a cross-sectional view of an embodiment of the invention including two stress-induced light guide regions.

FIG. 4(b) is a cross-sectional view of an embodiment of the invention including an array of stress-induced light guide regions.

DETAILED DESCRIPTION OF PREFERRED EMBODIMENTS

Figure 5:
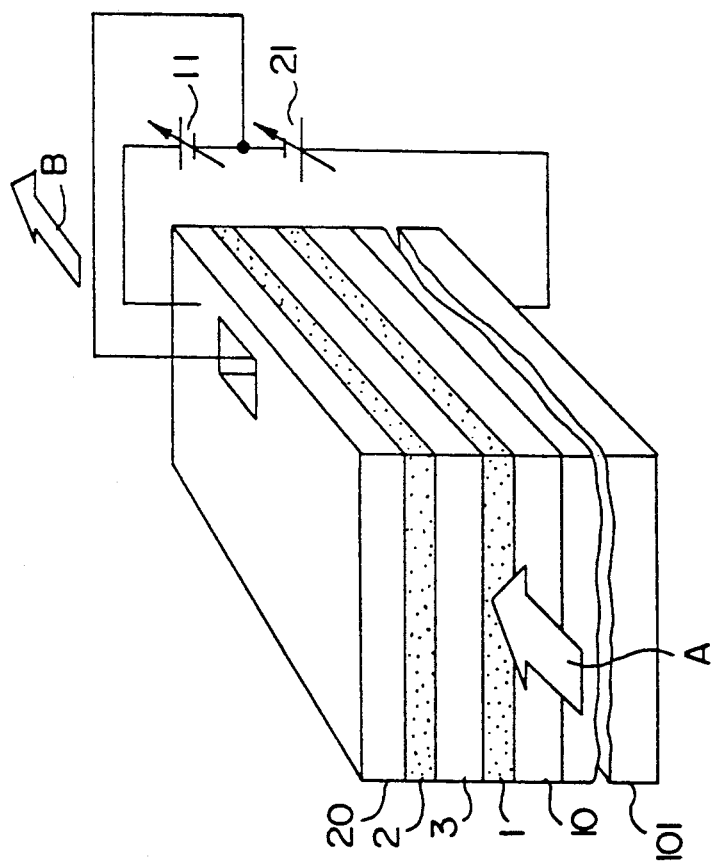
FIG. 5 is perspective, schematic view of an electrically actuated light coupler and modulator according to the prior art.

FIG. 1(a) is a perspective, schematic view of a light-controlled light coupler and modulator according to an embodiment of the invention. In FIG. 1(a) and the other figures, the same elements already described with respect to FIG. 5 are given the same reference numbers and are not described again. (In certain figures, some repetitive elements are given suffixes and other notations to avoid confusion between those repeated elements. However, the added notations do not indicate any change in function or constitution of the respective elements.) Unlike the prior art device, which includes a homogeneous spacer layer 3, the device of FIG. 1(a) includes a multiple quantum well structure 103 sandwiched by and in contact with the first and second light guide layers 1 and 2. Light guide layer 1 is interposed between and in contact with the cladding layer 10 and the multiple quantum well structure 103. Light guide layer 2 is interposed between and in contact with the cladding layer 20 and the multiple quantum well structure 103. Thus, in the device of FIG. 1(a), the first cladding layer 10, the first light guide layer 1, the multiple quantum well structure 103, the second light guide layer 2, and the second cladding layer 20 are serially disposed. As well known in the art, a multiple quantum well structure includes alternating semiconductor quantum well and quantum barrier layers. The quantum barrier layers have a larger energy band gap than the quantum well layers and each of the layers has a thickness on the order of 20 nanometers (nm) or less in order to produce the quantum mechanical phenomena associated with a multiple quantum well structure. As shown in FIG. 1(a), the thickness direction of the quantum well and quantum barrier layers lies in the same direction as the thickness directions of the other layers, i.e., generally perpendicular to the substrate 101. Generally, the outside dimensions of the embodiment of the invention shown in FIG. 1(a) are about the same as those of the prior art device shown in FIG. 5.

The device of FIG. 1(a) is produced essentially by the same processes employed in growing the various layers of the device shown in FIG. 5. The only difference lies in the deposition of the very thin layers comprising the multiple quantum well structure 103 which are preferably grown by MOCVD or MBE. Preferably, substrate 101 has an exposed (100) surface on which the layers 10 and 1, the multiple quantum well structure 103, and the layers 2 and 20 are successively grown. As in the prior art device, the aluminum composition ratio of the n-type $Al_xGa_{1-x}As$ cladding layers 10 and 20 is preferably about 0.3. The light guide layers 1 and 3 may be GaAs or $Al_xGa_{1-x}As$ so long as x is less than about 0.3 so that the refractive indices of the cladding layers are smaller than the refractive indices of the light guide layers 1 and 2 to confine light to those light guide layers.

A signal light beam, indicated by arrow A in FIG. 1(A), is incident on the light guide layer 1 at one end of the device. That signal light beam may carry information or be modulated within the device so that it carries information. The signal light beam propagates within the light guide layers 1 and 2 from one end of the device to the other. In order to propagate the fundamental mode of a signal light beam through the light guide layers 1 and 2, the thicknesses of those layers are chosen in the range of 100 to 400 nm, depending upon the wavelength of the signal light. A typical thickness for the multiple quantum well structure is 100 to 1,000 nm although thicker multiple quantum well structures may be employed. Although the dopant concentration of the respective layers in the structure is not limited to any particular value or range, it is preferable that the dopant concentration not exceed about $5 \times 10^{17}$ cm$^{-3}$ in order to avoid free carrier absorption of the signal light beam.

In operation, a signal light beam A is incident upon and enters a light guide layer 1 and emerges as output signal light beam B, both indicated by arrows in FIG. 1(a). As in the prior art device, because of the optical coupling between light guide layers 1 and 2, as the light propagates through the device in light guide layer 1, it is gradually transferred to light guide layer 2. At the critical device length, i.e., the critical light propagation path length, total transfer of the signal light from one light guide layer to the other occurs. The critical length depends on, among other parameters, the effective refractive index of the material that is contacted by and sandwiched between the light guide layers 1 and 2.

It is known in the art that when a control light of an appropriate wavelength, i.e., essentially monochromatic light of a selected wavelength, is incident on a multiple quantum well structure, the effective refractive index of the multiple quantum well structure changes in response to the intensity of the incident control light. This non-linear optical effect produces an effective refractive index $n_1$ of the multiple quantum well structure that equals a base refractive index $n_o$ of the multiple quantum well structure plus the product of a coefficient $\alpha$ of the non-linear optical effect, having a value of about $10^7$/cm$^2$W, times the intensity of the incident light. This refractive index variation is described in "Electronic Letters", Volume 21, page 26, 1985. This change in refractive index in response to the intensity of an incident control light is not observed in bulk semiconductor materials.

In order to produce the desired change in refractive index, the energy of the control light is chosen to be less than the energy band gap of the semiconductor materials employed in the multiple quantum well layers. When the quantum well layers are GaAs which has an energy band gap of about 1.42 electron volts, corresponding to a wavelength of about 850 nm, an appropriate control light wavelength is about 900 nm. An embodiment of a control light source 105 is shown schematically in FIG. 1(a). That light source embodiment includes a semiconductor laser 106 but could include a different kind of laser or other monochromatic light source that may include filters to produce an essentially monochromatic control light from a non-monochromatic light source.

The control light 300, indicated by three arrows in FIG. 1(a), is incident on the multiple quantum well structure transverse to the thickness direction of the layers of that structure and transverse to the direction of propagation of the signal light beam in the light guide layers. Depending upon the intensity of the control light, the refractive index of the multiple quantum well structure changes so that the degree of coupling between the light guide layers 1 and 2 varies. Through this variation, the input signal light beam A may be transferred from, or be prevented from being transferred from, the light guide layer 1 to the light guide layer 2 and/or the signal light beam B that emerges from one of the light guide layers of the device may be modulated in response to variations in intensity of the control light 300. Although not shown in the figures, the signal light beam may be input to and output from the coupler and modulator through optical fibers. In addition, the control light source and any optical fibers may be encapsulated in a single unit.

Preferably, the coupler and modulator is fabricated so that it has a length between the ends of the device, where the signal light beam enters and exits, equal to an integer multiple of the critical length so that there is strong coupling between the light guide layers 1 and 2 when no control light 300 is incident on the structure. Then, for example, when the control light 300 is present, it reduces or extinguishes the amount of the signal light beam that exits from guide layer 2 based on an input signal light beam incident on light guide layer 1. Thus, position switching of the signal light beam and/or its modulation is achieved in response to the intensity of the incident control light.

Since the light coupler and modulator is actuated entirely by the control light 300, it is readily compatible with other light-driven components that do not require a modulating electrical signal. Moreover, when a semiconductor laser is employed as the source of the control light, switching and modulation of the signal light beam can be achieved with a voltage amplitude of 2 volts, the signal applied to drive the laser, a significant improvement over the 10 volt signal required to drive the prior art device of FIG. 5. In addition, there is no need to make electrical contacts to buried layers or to provide for wiring for electrically connecting the coupler and modulator.

The arrangement of the control light 300 relative to the coupler and modulator is not limited to that shown in FIG. 1(a). In FIG. 1(b), the light source 105 is disposed opposite the cladding layer 20. In that arrangement, the control light 300 is incident on a multiple quantum well structure 103 parallel to the thickness direction of that multiple quantum well structure as well as transverse to the propagation direction of the signal light beam. Since the energy band gaps of the cladding layer 20 and the light guide layer 2 are larger than the effective energy band gap of the multiple quantum well structure 103, the attenuation of the control light 300 by those layers is not significant. When the control light 300 illuminates the multiple quantum well structure parallel to the thickness direction of the layers of that structure as in FIG. 1(b), a larger area is presented for illumination than when the relatively thin multiple quantum well structure is illuminated with the control light transverse to that thickness direction as in FIG. 1(a) Therefore, in the arrangement of FIG. 1(b), improved uniformity of illumination of the multiple quantum well structure by the control light 300 is achieved as compared to the arrangement of FIG. 1(a).

Figure 2A:
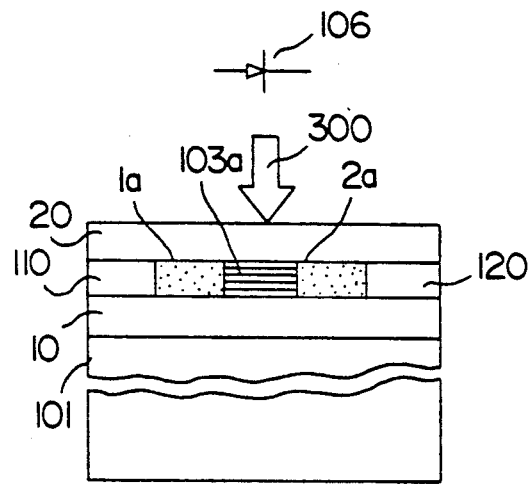
FIG. 2(a) is a cross-sectional view of a second embodiment of the present invention.

Another embodiment of the invention is shown in a cross-sectional view in FIG. 2(a). The device of FIG. 2(a) differs from that of FIG. 1(a) in the arrangement of the light guide layers 1a and 2a with respect to the multiple quantum well structure 103. Although in the device of FIG. 1(a) the light guide layers 1 and 2 are interposed between the cladding layers 10 and 20 and the multiple quantum well structure, in the device of FIG. 2(a), the cladding layers 10 and 20 directly sandwich and contact a multiple quantum well structure 103a that is a portion of a multiple quantum well structure layer 103 formed in fabrication of the device. In addition, the light guide layers 1a and 2a contact and sandwich the multiple quantum well structure 103 and are sandwiched by and in contact with the cladding layers 10 and 20. Further cladding layers 110 and 120 are disposed at and in contact with the light guide layers 1a and 2a, respectively, between and in contact with the cladding layers 10 and 20. Preferably, cladding layers 10, 20, 110, and 120 all have the same composition. The coupler and modulator embodiment of FIG. 2(a) thus is a horizontal arrangement of the light guide layers 1a and 2a sandwiching the multiple quantum well structure 103a and cladding layers 110 and 120 sandwiching the light guide layers in a serial arrangement of cladding layer, light guide layer, multiple quantum well structure, light guide layer, and cladding layer. By contrast, the device of FIG. 1(a) is a vertical arrangement in which the light guide layers 1 and 2 sandwich the multiple quantum well structure 103 and are, in turn, sandwiched by the cladding layers 10 and 20 in a vertical arrangement. In the vertical arrangement of FIGS. 1(a) and 1(b), the control light 300 is either directly incident on the multiple quantum well structure or passes through one light guide layer to reach the multiple quantum well structure. However, in the horizontal arrangement of FIG. 2(a), the control light is not directly incident on the multiple quantum well structure 103a and never has to pass through a light guide layer to reach the multiple quantum well structure.

As in the device shown in FIG. 1(b), in the device of FIG. 2(a), the control light 300 is incident on the relatively large area of a layer of the multiple quantum well structure 103, i.e., parallel to the thickness direction of the multiple quantum well structure layers. The signal light beam incident on guide layer 1a is, in the absence of control light 300, coupled to light guide layer 2a from which it exits the coupler and modulator. The coupling between the two guide layers is controlled by the intensity of the control light 300 incident on the multiple quantum well structure 103a between the two light guide layers 1a and 2a for switching the position and/or modulating the signal light propagating along the light guide layers transverse to the control light 300. The cladding layers 10, 20, 110, and 120 confine the signal light and permit the interval between the light guide layers 1a and 2a to be increased compared to the device of FIG. 1(a), for example, to 5 microns. In the device of FIG. 1(a), the light guide layers are separated only by about 1 micron, the thickness of the multiple quantum well structure 103. In FIG. 2(a), the light guide layers 1a and 2a are separated by the width, not the thickness, of the multiple quantum well structure.

Figure 2B:
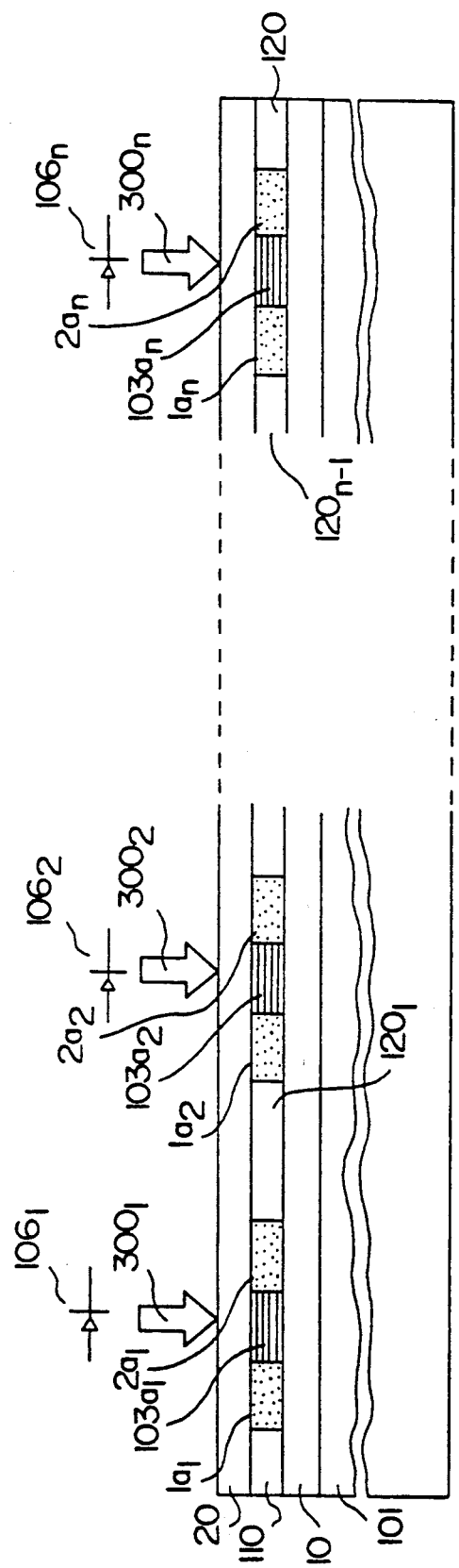
FIG. 2(b) is a cross-sectional view of an embodiment of the invention including an array of light guide layers.

In FIG. 2(b), a horizontal array of couplers and modulators employing as a unit the embodiment of the structure of FIG. 2(a) is shown. In the horizontal array of FIG. 2(b), a number, i.e., 1 through n, of the devices of FIG. 2(a are integrated on a single substrate 101 and include common cladding layers 10 and 20. The leftmost unit shown in FIG. 2(b) includes the same elements as the device of FIG. 2(a but numbered with a subscript 1 to indicate the first unit. The next unit to the right includes subscript 2 in the numbering of its elements, and so forth through the nth unit at the far right of FIG. 2(b). The units are separated by cladding layers $120_1-120_{n-1}$. Thus, each light coupler and modulator unit is independent in its operation. However, the array permits a large number of signal light beams to be simultaneously processed with respective control lights produced by light sources $106a_1 \ldots 106a_n$.

The array of FIG. 2(b) can be made even more complex by disposing coupler and modulator units on both sides, i.e., back-to-back, on the common substrate 101. An embodiment of such an array is shown in a cross-sectional view in FIG. 2(c). The embodiment illustrated in FIG. 2(c) includes a plurality of light coupler and modulator units, each unit having the structure of the embodiment of FIG. 2(a). The numbers of the elements of the units FIG. 2(c), include primes (') to distinguish them from the elements on the top side of the substrate. Like the simpler array shown in FIG. 2(b), each of the units in FIG. 2(c) operates independently in position coupling and modulating signal light beams respectively applied to the individual units and acted upon by the separate control light sources $106 \ldots 106_n, 106_1' \ldots 106_n'$.

Figure 2C:
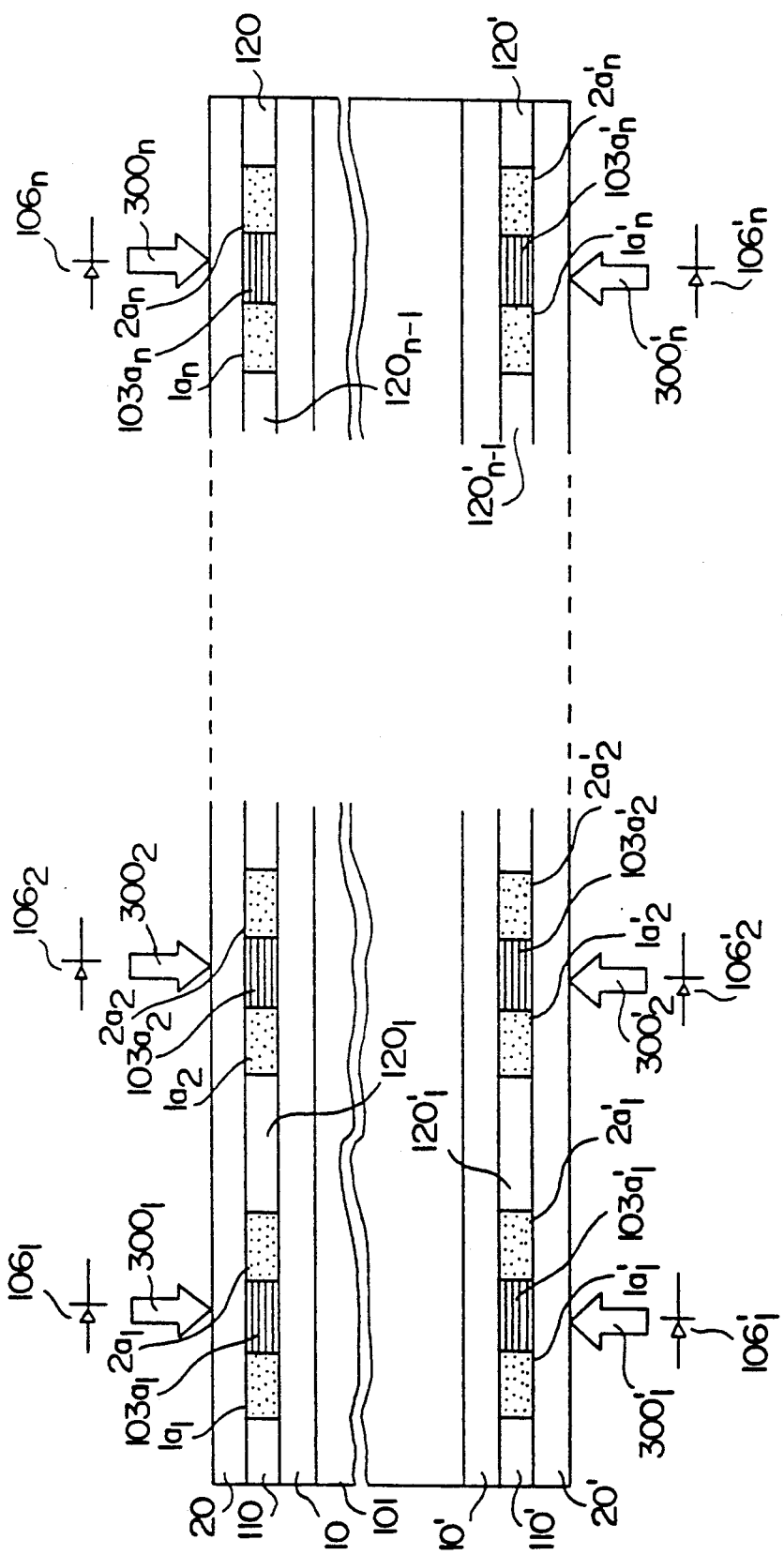
FIG. 2(c) is a cross-sectional view of still another embodiment of the invention including an array of light guide layers.
Figure 2D:
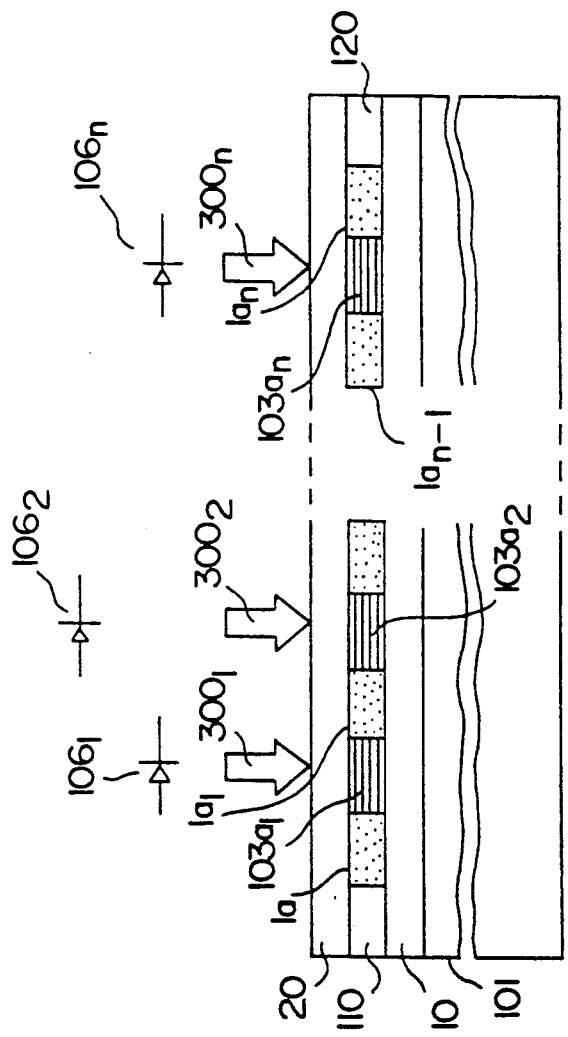
FIG. 2(d) is a cross-sectional view of a further embodiment of the invention including an array of light guide layers.

A different embodiment of an array incorporating units similar to the device of FIG. 2(a) is shown in a cross-sectional view in FIG. 2(d). The array of FIG. 2(d) is different from the array of FIG. 2(b) in an important respect. In the array of FIG. 2(d), a plurality of alternating light guide layers and multiple quantum well structures are sandwiched between the two cladding layers 10 and 20. (The light guide layers are numbered $1a, 1a' \ldots 1a_n$ in FIG. 2(d), a minor change from the numbering of the light guide layers of FIGS. 2(a)-2(c) to avoid confusion.) Since there are no cladding layers interposed in the horizontal alternating array of the light guide layers and quantum well structures, the array of FIG. 2(d) can operate in basically the same manner already described for the coupler and modulator of FIG. 2(a) but with additional flexibility. Unlike the array of FIG. 2(b) in which a signal light beam can be coupled only to the neighboring light guide layer on the opposite side of the adjacent multiple quantum well structure portion $103a_i$, in the array of FIG. 2(d), an input signal light beam can be coupled from one light guide layer, e.g., $1a$, through an intermediate light guide layer, e.g., $1a_1$, and to a third, e.g., $1a_2$, or to an even more distant light guide layer. If the length of the device is several integer critical lengths, a signal light beam can be coupled across several intervening multiple quantum well structures, i.e., across more than one light guide layer, before it exits from the device. The intervening cladding layers in the array of FIG. 2(b) prevent that wide signal light beam position shift. In addition, the array of FIG. 2(d) enables the simultaneous switching in position and/or modulation of multiple signal light beams when different control lights 300 are applied to respective multiple quantum well structures to produce coupling or modulation of respective signal light beams in neighboring pairs of light guide layers. In other words, depending upon the positioning and/or actuation of the respective control light sources $106, 106' \ldots 106$ and the length of the array relative to the critical length, signal light beams may be selectively coupled between and/or modulated with respect to pairs of neighboring light guide layers and even more widely spaced light guide layers.

Figure 2E:
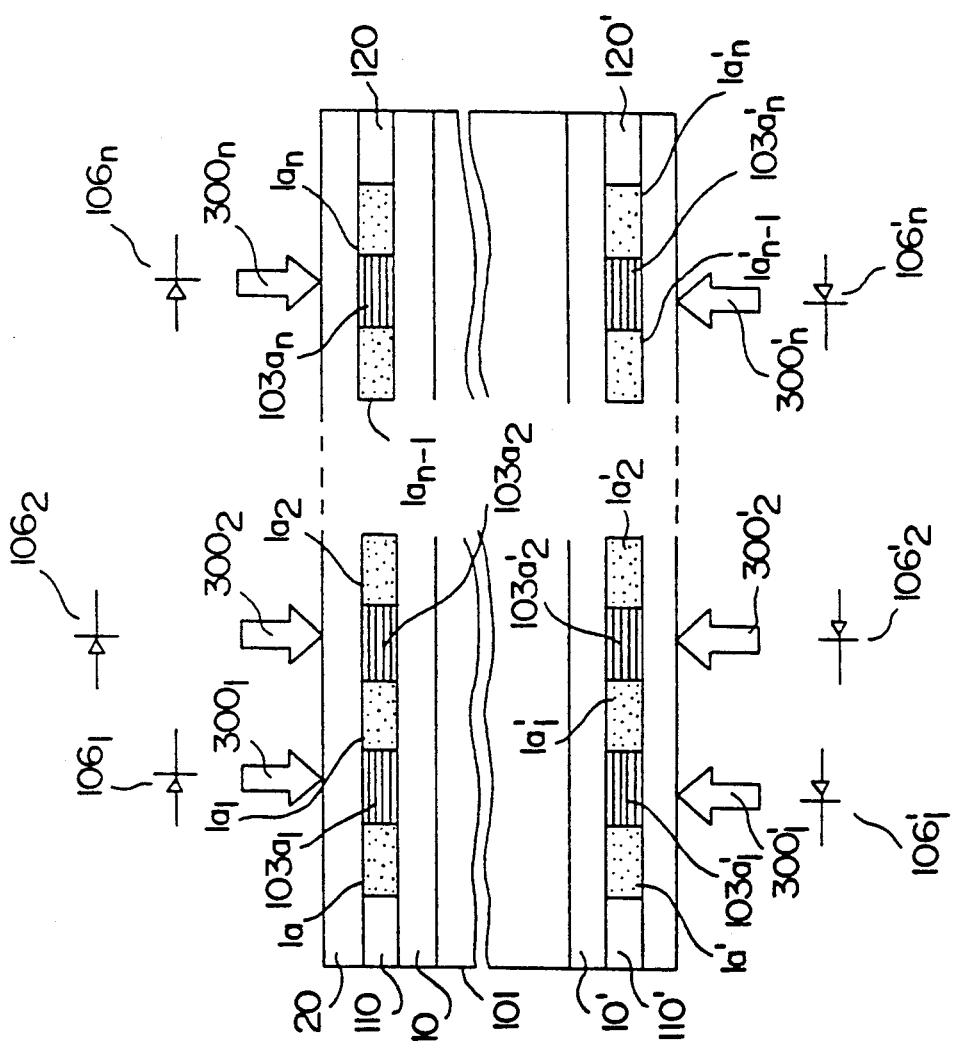
FIG. 2(e) is a cross-sectional view of still another embodiment of the invention incorporating an array of light guide layers.

Furthermore, as shown in the embodiment of the invention schematically illustrated in FIG. 2(e), arrays like those of FIG. 2(d) may be mounted back-to-back on a common substrate 101 like the array of FIG. 2(c). Separate control light sources $106 \ldots 106_n$ and $106' \ldots 106'_n$, are provided for each neighboring pair of light guide layers for actuation in accordance with desired coupling and modulation between neighboring and more remote pairs of light guide layers. The arrays of FIGS. 2(b)-2(d) permit rapid, light-controlled two dimensional position switching and/or modulation of multiple signal light beams.

Figure 3A:
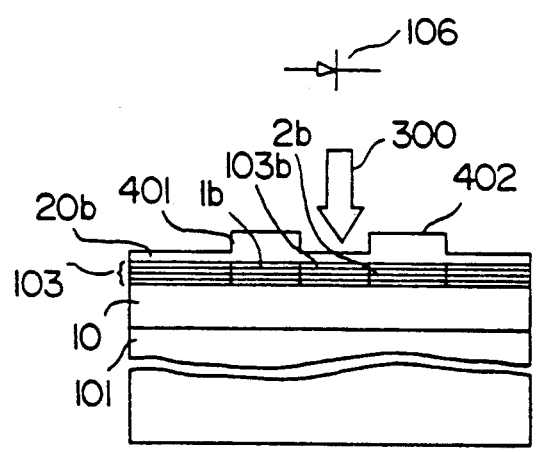
FIG. 3(a) is a cross-sectional view of yet another embodiment of the invention including two light guide regions opposite corresponding ridges of a cladding layer.

Still another embodiment of the invention is illustrated in cross-section in FIG. 3(a). That coupler and modulator is simpler in structure and fabrication than the embodiments previously described. In the embodiment of FIG. 3(a), cladding layers 10 and 20b sandwich and contact the multiple quantum well structure 103. No separate light guide layers are present. Rather, the cladding layer 20b includes two ridges 401 and 402 that project away from the multiple quantum well structure 103. While the ridges 401 and 402 are shown as rectangular in cross-section in FIG. 3(a), no limitation as to the cross-sectional shape of the ridges is implied. Because of the presence of the ridges, the lateral, i.e., along a direction transverse to the thickness direction of the layers of the multiple quantum well structure 103, distribution of the product of refractive index and thickness of the cladding layer 20b varies. That product has a higher value at the two ridges, altering the optical properties of the multiple quantum well structure 103 opposite those ridges, thereby producing light guide regions 1b and 2b within the multiple quantum well structure opposite the respective ridges. In other words, light guide regions 1b and 2b are produced in the multiple quantum well structure opposite the ridges 401 and 402, respectively, with a portion 103b of the multiple quantum well structure intervening. These light guide regions function in the same manner as the light guide layers described for the previous embodiments but do not require separate fabrication. The control light 300 is incident on the coupler and modulator between the ridges 401 and 402, i.e., on the portion 103b of the multiple quantum well structure between the two light guide regions.

The embodiment of the invention shown in FIG. 3(a) has a particular advantage of simplicity in production. That device is manufactured by successively depositing the first cladding layer 10, the multiple quantum well structure 103, and the second cladding layer 20b by conventional processes. Thereafter, the ridges are formed in the second cladding layer 20b by masking and etching using conventional photolithography techniques.

Figure 3B:
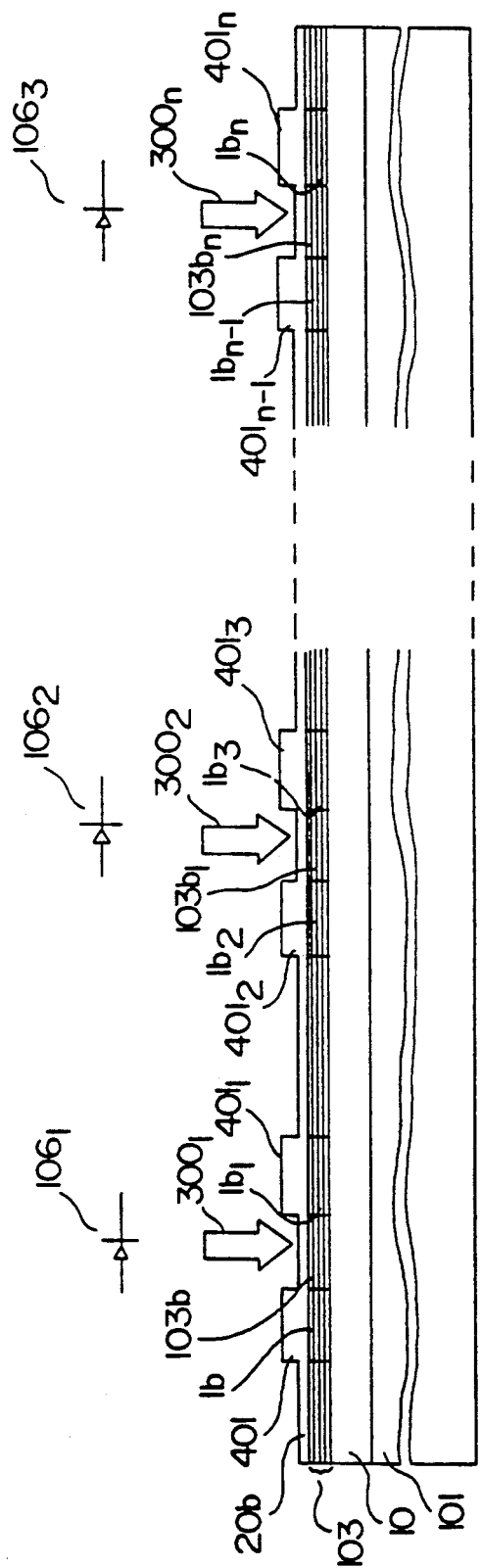
FIG. 3(b) is a cross-sectional view of a further embodiment of the invention including an array of light guide regions opposite respective ridges of a cladding layer.
Figure 3C:
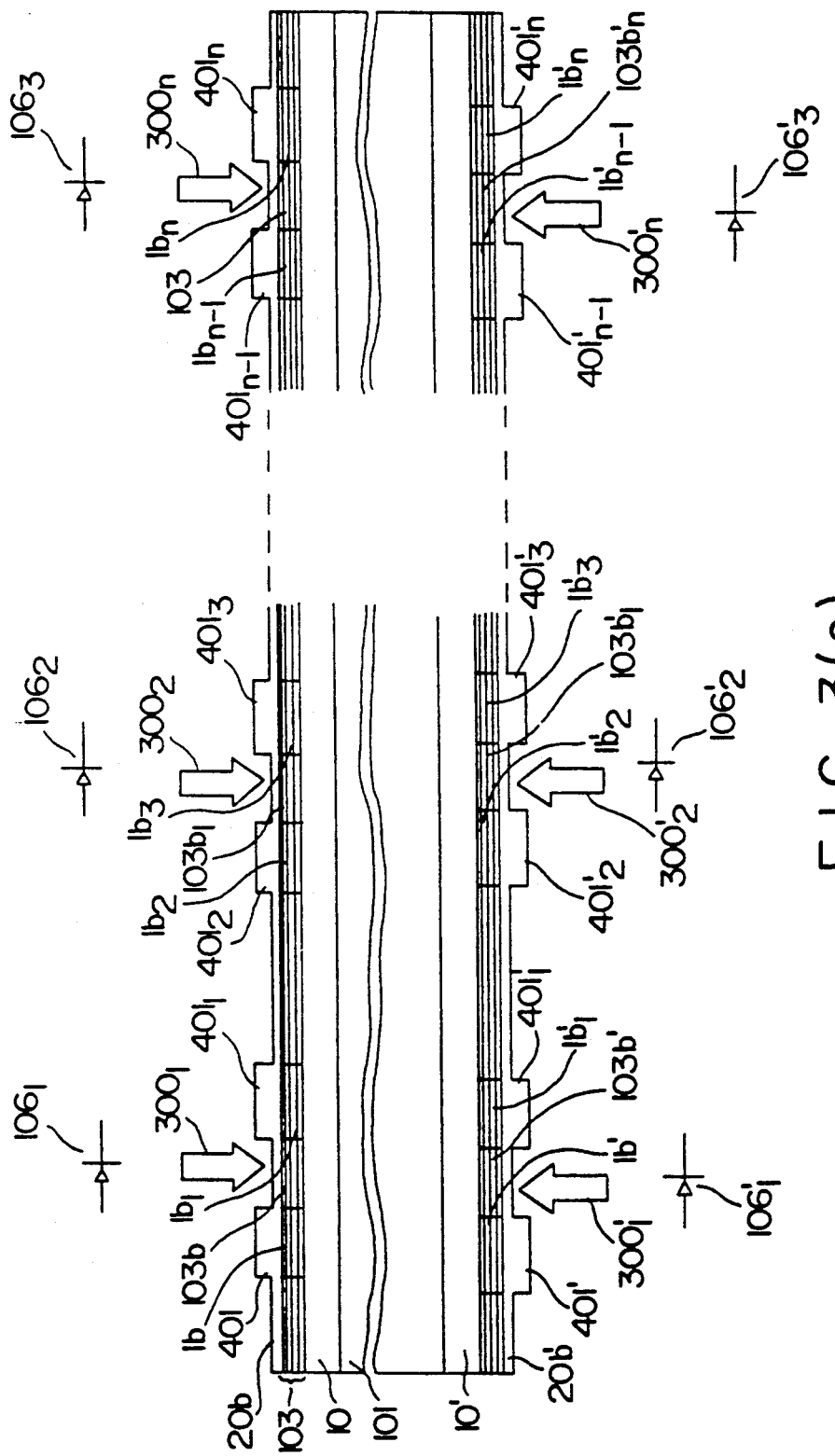
FIG. 3(c) is a cross-sectional view of still another embodiment of the invention incorporating an array of light guide regions.

Coupler/modulator arrays incorporating units having the device structure shown in FIG. 3(a) can be formed analogously to the arrays of FIGS. 2(d) and 2(e). Such a linear array in which device embodiments of FIG. 3(a) are combined side-by-side is shown in FIG. 3(b). (In FIGS. 3(b) and 3(c), the light guide regions are numbered $1b, 1b_1 \ldots 1b_n$ and $1b', 1b'_1 \ldots 1b'_n$, rather than the $1b, 2b$ numbering of FIG. 3(a) to avoid confusion.) A back-to-back arrangement of two of the arrays of FIG. 3(b) on a single substrate 101 is shown in FIG. 3(c). Since the arrays of FIGS. 3(b) and 3(c) function similarly to those of FIGS. 2(d) and 2(e), a detailed description of their modes of operation is not necessary. Like the array of FIG. 2(d), the array of FIG. 3(b) may be operated as if it included isolated pairs of neighboring light guide regions between which light may be coupled and/or modulated. In addition, since, in the embodiments of FIGS. 3(b) and 3(c), the multiple quantum well structure 103 is continuous between neighboring light guide regions, switching and modulation of signal light beams between light guide regions more remote from each other than neighboring pairs of light guide regions is possible depending upon the length of the array in the direction of signal light beam propagation relative to the critical length for the particular device.

Still another embodiment of the invention is shown in a cross-sectional view in FIG. 4(a). The structure of FIG. 4(a) includes, successively grown on a substrate 101, first cladding layer 10 and multiple quantum well structure 103. However, instead of growing a second cladding layer of the same composition as the first cladding layer 10, a relatively thick stripe 500 of a different material, such as silicon nitride, is formed on the exposed surface of the multiple quantum well structure 103 opposite the first cladding layer 10. The stripe 500 includes side surfaces 501 and 502 transverse to the multiple quantum well structure 103, i.e., generally parallel in FIG. 4(a) to the thickness direction of the layers of the multiple quantum well structure. Although the stripe 500 has a rectangular cross-section in FIG. 4(a), the stripe 500 may have other cross-sectional shapes and is not limited to a rectangular cross-section.

Because the material employed in the stripe 500 is of a different composition from that employed in a multiple quantum well structure, it has different properties including a different coefficient of thermal expansion. When stripe 500 is silicon nitride, it is formed by depositing a layer of silicon nitride over the entire surface of the multiple quantum well structure 103, for example, in a conventional deposition process at about 700° C. Thereafter, through conventional photolithography and etching techniques, the stripe 500 is formed. The difference between the deposition temperature and the operation temperature, i.e., room temperature, of the embodiment and the coefficients of thermal expansion of the multiple quantum well structure and the stripe 500 places mechanical stresses on the multiple quantum well structure at the normal operational temperature. Where the side surfaces 501 and 502 of stripe 500 intersect the multiple quantum well structure, those mechanical stresses are concentrated and locally alter the effective refractive index of the multiple quantum well structure. The altered refractive index produces the light guide regions 1c and 2c in the multiple quantum well structure opposite the side surfaces 501 and 502 of the stripe 500. These light guide regions 1c and 2c are coupled by the portion 103c of the multiple quantum well structure lying between the regions. The control light 300 is incident on that portion 103c of the multiple quantum well structure after passing through stripe 500. Thus, the material employed for stripe 500 must be chosen so that the control light 300 is not reflected by the stripe 500 nor unduly attenuated before reaching the multiple quantum well structure portion 103c.

Like the embodiment of FIG. 3(a), the embodiment of FIG. 4(a) is relatively easily produced. The fabrication process includes successively growing the cladding layer 10 and the multiple quantum well structure 103 and depositing the layer from which stripe 500 is formed by masking and etching. Unlike the device of FIG. 2(a), in making the device of FIG. 4(a) there is no need to define the multiple quantum well structure so that light guide layers can be deposited adjacent to its sides or to carry out other complicated processing steps.

Figure 4C:
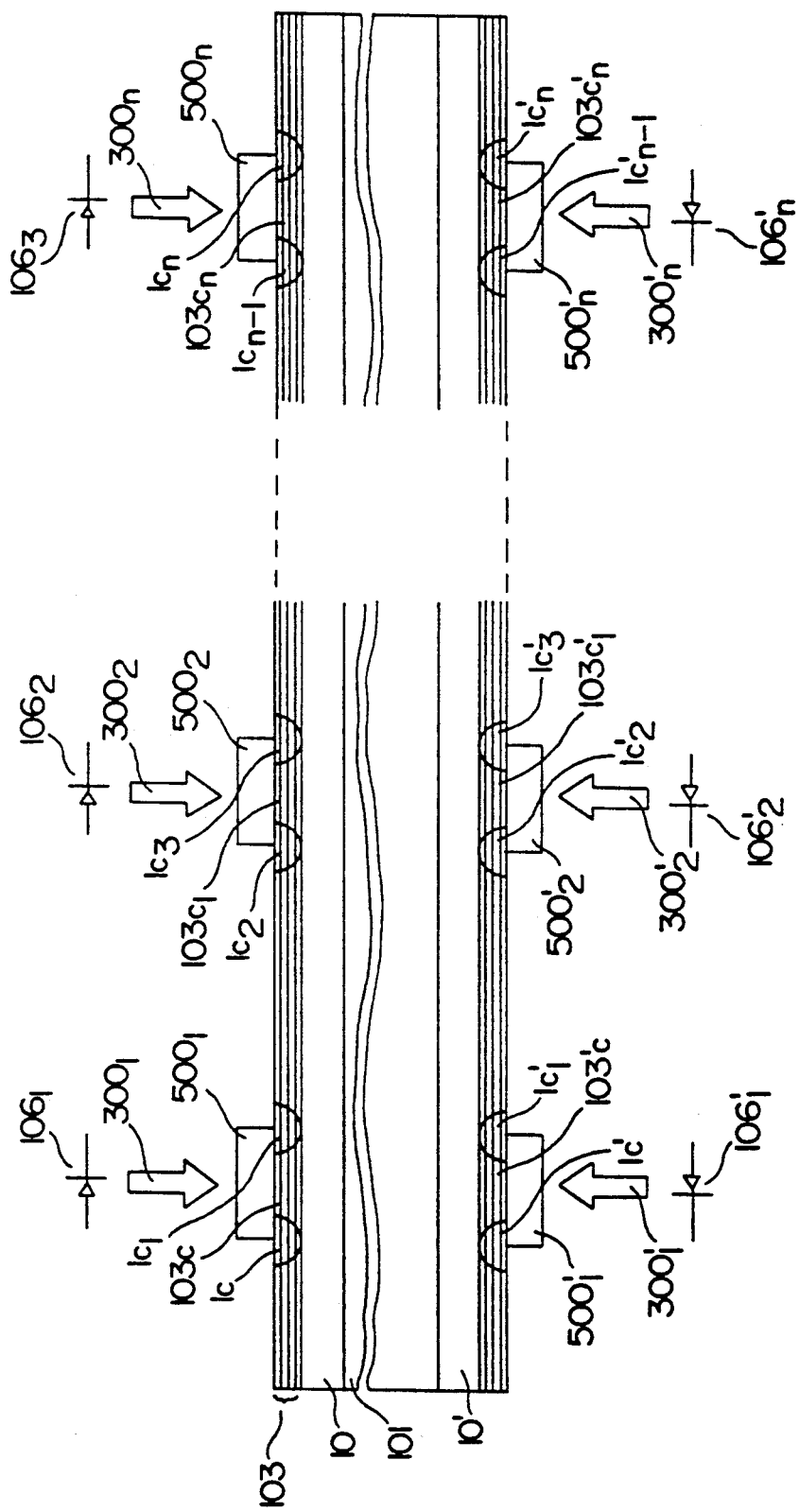
FIG. 4(c) is a cross-sectional view of an embodiment of the invention including another array of stress-induced light guide regions.

Multiple units of the embodiment of FIG. 4(a) can be combined to form arrays of couplers and modulators on a common substrate like those shown in FIGS. 4(b) and 4(c). The arrays of FIGS. 4(b) and 4(c) are respectively analogous to the arrays of FIGS. 2(d) and 3(b) and 2(e) and 3(c) and do not need detailed description as to structure or mode of operation. (In FIGS. 4(b) and 4(c), the light guide regions are numbered $1c, 1c_1 \ldots 1c_n$ and $1c', 1c'_1 \ldots 1c'_n$, rather than the $1c, 2c$ numbering of FIG. 4(a) to avoid confusion.) Like the arrays of FIGS. 2(d) and 2(e), neighboring pairs of light guide regions may be employed for light coupling and modulation. In addition, a signal light beam may be coupled between more remote, i.e., non-neighboring, pairs of light guide regions if the length of the structure is an appropriate integer multiple of the critical length.

In the specific embodiments described above, GaAs and $Al_xGa_{1-x}As$ are employed as the semiconductor materials in the various layers and regions. Other semiconductor materials, such as indium phosphide (InP), indium gallium arsenide (InGaAs), and even silicon (Si) and germanium (Ge), the latter particularly in strained superlattice structures, may be employed in embodiments of the invention. Since the novel coupler and modulator does not depend on a voltage signal or reverse or forward biasing of particular junctions, various conductivity type semiconductor materials, including intrinsic and semi-insulating, may be employed for the various layers in embodiments of the invention to accommodate production constraints or matching to characteristics of other related or interconnected devices. Moreover, the multiple quantum well structure referred to here may be as simple as a single quantum well layer disposed between two quantum barrier layers. However, a larger number of alternating quantum well and quantum barrier layers is desired to increase the non-linear optical effect, i.e., the change in refractive index of the multiple quantum well structure in response to the intensity of incident, essentially monochromatic control light.

I claim:

1. A light-controlled semiconductor light coupler for altering the position of and modulating a signal light beam in response to the intensity of a control light comprising:

a multiple quantum well structure including alternating semiconductor quantum well and quantum barrier layers, each layer having a thickness, the multiple quantum well structure having an index of refraction that varies in response to the intensity of incident, essentially monochromatic control light;

first and second semiconductor light guide layers contacting and sandwiching the multiple quantum well structure for transmitting a signal light beam variably coupled between the first and second light guide layers in response to the intensity of the control light incident on the multiple quantum well structure, wherein the light guide layers have a higher index of refraction than the multiple quantum well structure; and first and second semiconductor cladding layers respectively contacting the first and second light guide layers and forming a structure having the first cladding layer, the first light guide layer, the multiple quantum well structure, the second light guide layer, and the second cladding layer serially disposed, the first and second cladding layers confining the signal light beam propagating transverse to the control light in the first and second light guide layers.

2. The light-controlled semiconductor light coupler of claim 1 including a source of essentially monochromatic control light for illuminating the multiple quantum well structure with the control light transverse to the direction of propagation of the signal light beam in the first and second light guide layers.

3. The light-controlled semiconductor light coupler of claim 2 wherein the source of control light is a semiconductor laser.

4. The light-controlled semiconductor light coupler of claim 2 wherein the source of control light is disposed to illuminate the multiple quantum well structure substantially perpendicular to the thicknesses of the layers of the multiple quantum well structure.

5. The light-controlled semiconductor light coupler of claim 2 wherein the source of control light is disposed to illuminate the multiple quantum well structure substantially parallel to the thicknesses of the layers of the multiple quantum well structure.

6. The light-controlled semiconductor light coupler of claim 1 wherein the first and second light guide layers and the quantum well and quantum barrier layers are selected from the group consisting of GaAs and AlGaAs and the first and second cladding layers are AlGaAs.

7. A light-controlled semiconductor light coupler for altering the position of and modulating a signal light beam in response to the intensity of a control light comprising:

a multiple quantum well structure including alternating semiconductor quantum well and quantum barrier layers, each layer having a thickness, the multiple quantum well structure having an index of refraction that varies in response to the intensity of incident, essentially monochromatic control light;

first and second semiconductor light guide layers contacting and sandwiching the multiple quantum well structure for transmitting a signal light variably coupled between the first and second light guide layers in response to the intensity of the control light incident on the multiple quantum well structure, wherein the light guide layers have a higher index of refraction than the multiple quantum well structure;

first and second semiconductor cladding layers contacting and sandwiching the first light guide layer, the second light guide layer, and the multiple quantum well structure, the first and second cladding layers confining the signal light beam propagating transverse to the control light in the first and second light guide layers; and a source of essentially monochromatic control light for illuminating the multiple quantum well structure with the control light transverse to the direction of propagation of the signal light beam in the first and second light guide layers and substantially parallel to the thicknesses of the layers of the multiple quantum well structure.

8. The light-controlled semiconductor light coupler of claim 7 wherein the source of control light is a semiconductor laser.

9. The light-controlled semiconductor light coupler of claim 7 including third and fourth cladding layers disposed between the first and second cladding layers sandwiching and contacting the first and second guide layers, respectively.

10. The light-controlled semiconductor light coupler of claim 7 including a plurality of units disposed between the first and second cladding layers, each unit including a light guide layer, a multiple quantum well structure, and the second light guide layer serially disposed between the first and second cladding layers and a plurality of sources of essentially monochromatic control light disposed opposite from and for illuminating respective multiple quantum structures transverse to the direction of propagation of signal light beams through the respective light guide layers for controlling the light coupling between pairs of neighboring light guide layers separated by a multiple quantum well structure in response to the intensity of the control light incident on the respective multiple quantum well structures disposed between the neighboring light guide layers.

11. The light-controlled semiconductor light coupler of claim 7 including a plurality of multiple quantum well layers and light guide layers alternatingly disposed between the first and second cladding layers and a plurality of sources of essentially monochromatic control light disposed opposite from and for illuminating respective multiple quantum well structures transverse to the direction of propagation of signal light beams through the respective light guide layers for controlling the light coupling between neighboring light guide layers, separated by a multiple quantum well structure, in response to the intensity of the control light incident on the multiple quantum well structure disposed between the neighboring light guide layers.

12. The light-controlled semiconductor light coupler of claim 7 wherein the first and second light guide layers and the quantum well and quantum barrier layers are selected from the group consisting of GaAs and AlGaAs, and the first and second cladding layers are AlGaAs.

13. A light-controlled semiconductor light coupler for altering the position of and modulating a signal light beam in response to the intensity of a control light comprising:

a multiple quantum well structure including alternating semiconductor quantum well and quantum barrier layers, each layer having a thickness, the multiple quantum well structure having an index of refraction that varies in response to the intensity of incident, essentially monochromatic control light; and first and second semiconductor cladding layers contacting and sandwiching the multiple quantum well structure wherein the second cladding layer includes at least first and second spaced apart ridges extending generally parallel to the thicknesses of the layers of the multiple quantum well structure, respectively producing first and second light guide regions in the multiple quantum well structure opposite the first and second ridges, respectively, for transmitting a signal light beam variably coupled between the first and second light guide regions in response to the intensity of the control light incident on the multiple quantum well structure between the first and second ridges and transverse to the direction of propagation of the signal light beam through the first and second light guide regions, the first and second cladding layers confining the signal light beam.

14. The light-controlled semiconductor light coupler of claim 13 including a source of essentially monochromatic control light for illuminating the multiple quantum well structure transverse to the direction of propagation of the signal light beam through the first and second light guide regions.

15. The light-controlled semiconductor light coupler of claim 14 wherein the source of control light is a semiconductor laser.

16. The light-controlled semiconductor light coupler of claim 13 wherein the second cladding layer includes a plurality of ridges for forming a plurality of light guide regions in the multiple quantum well structure opposite the respective ridges for transmitting signal light beams variably coupled between neighboring light guide regions in response to the intensity of essentially monochromatic control light beams respectively incident on the multiple quantum well structure between the respective neighboring light guide regions.

17. The light-controlled semiconductor light coupler of claim 16 including a plurality of sources of essentially monochromatic control light disposed opposite from and for illuminating a respective portion of the multiple quantum well structure between a pair of neighboring light guide regions transverse to the direction of propagation of signal light beams through the respective light guide regions.

18. The light-controlled semiconductor light coupler of claim 13 wherein the quantum well and quantum barrier layers are selected from the group consisting of GaAs and AlGaAs and the first and second cladding layers are AlGaAs.

19. A light-controlled semiconductor light coupler for altering the position of and modulating a signal light beam in response to the intensity of a control light comprising:

a multiple quantum well structure including alternating semiconductor quantum well and quantum barrier layers, each layer having a thickness, the multiple quantum well structure having an index of refraction that varies in response to the intensity of incident, essentially monochromatic control light;

a semiconductor cladding layer contacting the multiple quantum well structure and confining a signal light beam to the multiple quantum well structure; and at least one stripe of a second material having a different composition from the semiconductor multiple quantum well structure layers and generally opposed first and second sides generally aligned with the thicknesses of the layers of the multiple quantum well structure, disposed on the multiple quantum well structure opposite the first cladding layer, producing first and second light guide regions in the multiple quantum well structure respectively opposite the first and second sides through stress applied by the stripe to the multiple quantum well structure, the first and second light guide regions for transmitting a signal light beam variably coupled between the first and second guide layers in response to the intensity of the control light incident on the multiple quantum well structure between the first and second light guide regions and transverse to the direction of propagation of a signal light beam through the first and second light guide regions, the first cladding layer confining the signal light beam.

20. The light-controlled semiconductor light coupler of claim 19 including a source of essentially monochromatic control light for illuminating the multiple quantum well structure transverse to the direction of propagation of the signal light beam through the first and second light guide layers.

21. The light-controlled semiconductor light coupler of claim 20 wherein the source of control light is a semiconductor laser.

22. The light-controlled semiconductor light coupler of claim 19 including a plurality of stripes of the second material disposed on the multiple quantum well layer opposite the cladding layer, each strip including respective first and second sides generally aligned with the thickness direction of the multiple quantum well structure layers, each stripe producing a light guide region in the multiple quantum well structure opposite each of the first and second sides of each of the second stripes through stress applied to the multiple quantum well structure, the light guide regions for transmitting signal light beams variably coupled between neighboring light guide regions in response to the intensity of essentially monochromatic control light incident on the multiple quantum well structure between neighboring light guide regions.

23. The light-controlled semiconductor light coupler of claim 22 including a plurality of essentially monochromatic sources of control light, each source disposed for illuminating respective portions of the multiple quantum well structure between a pair of neighboring light guide regions transverse to the direction of propagation of signal light beams through the respective light guide regions.

24. The light-controlled semiconductor light coupler of claim 20 wherein the quantum well and quantum barrier layers are selected from the group consisting of GaAs and AlGaAs, the cladding layer is AlGaAs, and the second material is silicon nitride.

* * * * *